United States Patent
Tegge, Jr. et al.

(10) Patent No.: US 6,931,179 B2
(45) Date of Patent: Aug. 16, 2005

(54) LOSSLESS OPTICAL SPLITTER

(75) Inventors: Edward H. Tegge, Jr., Palm Bay, FL (US); Charles E. Bryant, Fellsmere, FL (US); Michael R. Lange, Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 456 days.

(21) Appl. No.: 10/039,382

(22) Filed: Oct. 29, 2001

(65) Prior Publication Data

US 2003/0081880 A1 May 1, 2003

(51) Int. Cl.⁷ .............................................. G02B 6/24
(52) U.S. Cl. ........................................ 385/48; 385/45
(58) Field of Search ..................................... 385/45, 48

(56) References Cited

U.S. PATENT DOCUMENTS

| | | | | |
|---|---|---|---|---|
| 4,760,580 A | * | 7/1988 | Thompson et al. | 372/50 |
| 4,915,469 A | | 4/1990 | Byron et al. | 350/96.16 |
| 4,934,775 A | | 6/1990 | Koai | 350/96.14 |
| 5,323,474 A | | 6/1994 | Hornung et al. | 385/24 |
| 5,471,334 A | | 11/1995 | Masuda et al. | 359/177 |
| 5,539,847 A | * | 7/1996 | Lerminiaux et al. | 385/45 |
| 5,668,652 A | | 9/1997 | Hashomoto et al. | 359/125 |
| 5,978,531 A | * | 11/1999 | Funabashi | 385/45 |
| 6,177,992 B1 | | 1/2001 | Braun et al. | 356/327 |
| 6,208,456 B1 | | 3/2001 | Lawrence | 359/333 |
| 6,252,719 B1 | | 6/2001 | Eichenbaum | 359/634 |
| 6,269,209 B1 | * | 7/2001 | Terada et al. | 385/51 |
| 6,282,343 B1 | * | 8/2001 | Kim et al. | 385/45 |
| 6,590,698 B1 | * | 7/2003 | Ohtsuki et al. | 359/326 |

FOREIGN PATENT DOCUMENTS

| | | | | |
|---|---|---|---|---|
| EP | 0 474 426 | 3/1992 | | G02B/6/28 |
| EP | 0 721 261 | 7/1996 | | H04B/10/17 |
| EP | 0 881 511 | 4/1998 | | G02B/6/12 |

* cited by examiner

*Primary Examiner*—Akm Enayet Ullah
*Assistant Examiner*—Jerry T Rahll
(74) *Attorney, Agent, or Firm*—Allen, Dyer, Doppelt, Milbrath & Gilchrist, P.A.

(57) ABSTRACT

A system for processing an optical signal into a plurality of optical output signals includes a laser for generating an optical signal along an optical signal path. An optical splitter receives the optical signal and includes an input optical fiber and a stepped, optical splitter circuit formed from a plurality of laser ion doped optical waveguides branching into a plurality of output optical signals. An optical pump source pumps an optical pump signal through the stepped, optical splitter circuit and excites the erbium to distribute gain throughout the optical splitter.

18 Claims, 3 Drawing Sheets

LOSSLESS OPTICAL SPLITTER

FIELD OF THE INVENTION

This invention relates to the field of optical signal transmission, and more particularly, this invention relates to the field of optical signal splitting.

BACKGROUND OF THE INVENTION

Optical splitters are power dividers that produce "N" number of replica signals by splitting the power of the input optical signal N times. For example, a 1×2 optical splitter divides a single optical signal input into two optical signal outputs, each with half the power of the input signal. These optical splitters, however, also exhibit an additional power loss, called the excess loss, which is caused by the power inefficiency of the splitter. In the previous example of the 1×2 optical splitter, if the splitter is 99% efficient, the two optical output signals would have 49.5%, instead of 50%, of the power of the input optical signal. An example of this type of power splitting is shown in FIG. 1, where the $P_L$ is the excess power loss of the optical splitter.

The power loss resulting from processing these optical signals in optical splitters has a significant impact on the configuration of a telecommunications network. For example, a Cable TeleVision (CATV) network could have a transmitter outputting 5 dBm of power, and use receivers with input power sensitivities of −25 dBm. To minimize the number of transmitters, the CATV signal provider could divide the output of a transmitter with optical splitters to serve as many subscribers (receivers) as possible. The resulting signal distribution network could be implemented as shown in FIG. 2, where the optical signal from the transmitter 20 is split by the optical splitter 22 at the transmitter site, routed to remote distribution hubs 24, split again in optical splitters 26, and routed to the subscribers 28.

If the various optical splitters are 1×16 units with 1 dB of excess loss, then the optical splitters would introduce 26 dB of loss into the network. Because the power budget of this example is only 30 dB (5−(−25)), only 4 dB of power would remain for other network losses, such as fiber and connector loss, and link margin. For this example, the optical splitter loss has reduced the transmitter availability to 256 subscribers located within approximately 6 km of the transmitter. If the optical splitters did not exhibit the split loss, then the only loss incurred in the network would be caused by fiber attenuation and connectors. This low loss would allow the number and location of subscribers served by the transmitter to be increased to values limited by other than technical factors for the CATV operator.

SUMMARY OF THE INVENTION

The present invention advantageously overcomes the disadvantages of the prior art and provides a lossless optical splitter and system that processes an optical signal into a plurality of optical output signals without undue loss. In one aspect of the present invention, a laser generates an optical signal along an optical signal path. An optical splitter is positioned along the optical signal path and receives the optical signal. The optical splitter includes an input optical fiber that receives the optical signal. The stepped, optical splitter circuit is formed from a laser ion doped optical waveguide branching into a plurality of output optical signals. An optical pump source pumps an optical pump signal through the stepped, optical splitter circuit, excites the erbium, and distributes gain throughout the optical splitter.

The optical pump source is operative for pumping the optical pump signal through the splitter in the same direction as the optical signal entering the input optical fiber. The optical signal received within the input optical fiber is about 1550 nm wavelength and the optical pump signal is one of about 980 or about 1480 nm. The stepped, optical splitter circuit can comprise $N^m$ outputs, wherein m is the number of steps and N is the number of splitter branches per step. In another aspect of the present invention, the laser is a distributed feedback laser.

An optical splitter and method of the present invention are also disclosed.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

The present invention advantageously provides a lossless optical splitter that overcomes the inherent loss of prior art power splitters used in processing optical signals by implementing a gain element into the splitter to distribute gain throughout the optical splitter circuit. In a preferred aspect of the present invention, a stepped optical splitter circuit receives an optical signal and optical pump energy from an input optical fiber and is formed from a plurality of erbium ion doped optical waveguides branching into a plurality of output optical fibers. An optical pump source pumps an optical pump signal through the stepped, optical splitter circuit, exciting the erbium, and distributing gain throughout the optical splitter.

Figure 4:
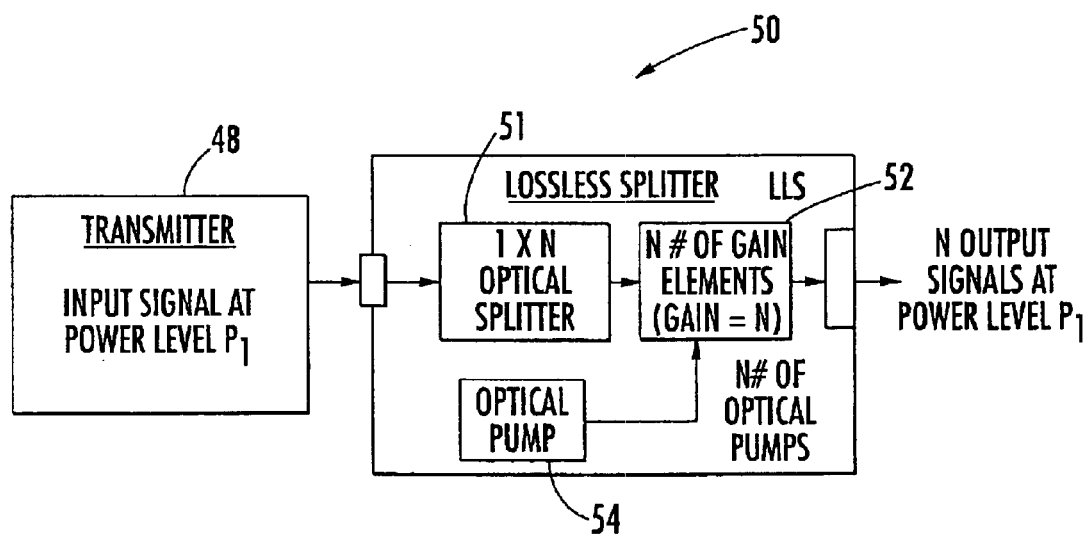
FIG. 4 is yet another lossless optical splitter that introduces an optical gain element after optical splitting.
Figure 5:
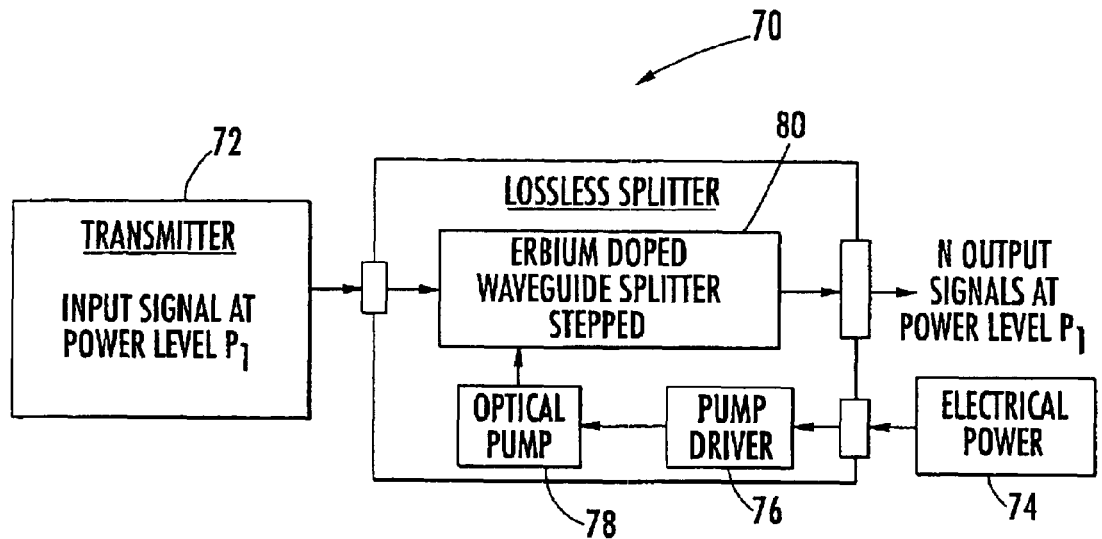
FIG. 5 is a lossless optical splitter of the present invention and showing the basic components of the stepped optical splitter.
Figure 6:
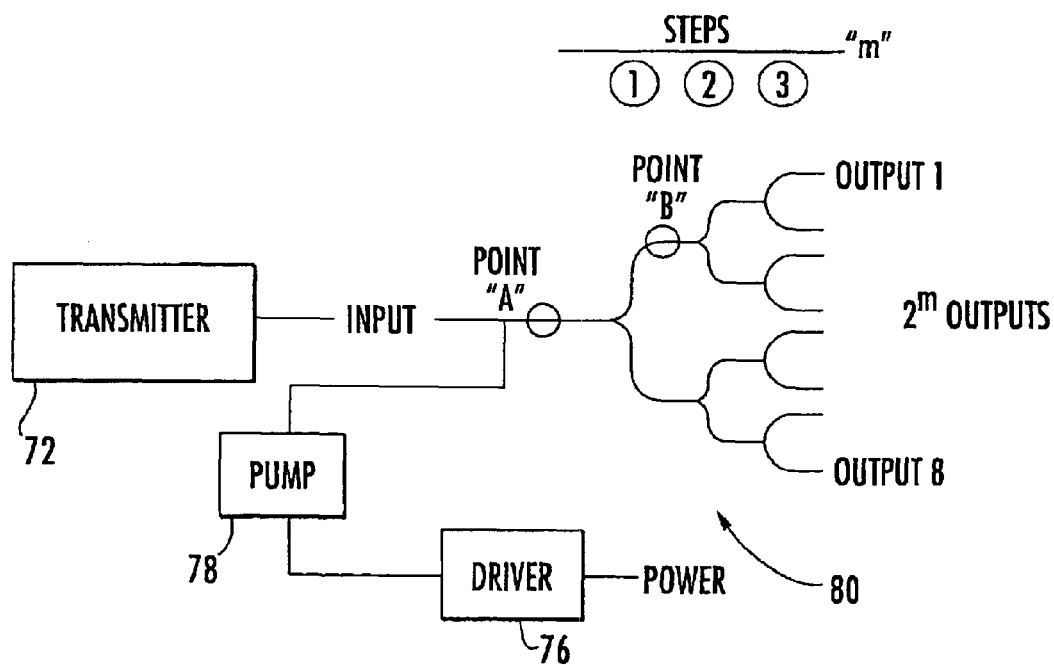
FIG. 6 is a fragmentary view of the lossless optical splitter of the present invention showing the stepped optical circuit configuration.

By way of background, two types of lossless optical splitters will first be described with reference to FIGS. 3 and 4, before a more detailed description of the lossless optical splitter of the present invention as shown in FIGS. 5 and 6, with a stepped optical configuration.

A Lossless Optical Splitter (LLS) can overcome the inherent loss of a conventional power splitter by implementing a gain element into the optical splitter. Two architectures for implementing a lossless splitter are shown in FIGS. 3 and 4. In both embodiments shown in FIGS. 3 and 4, the optical splitter can use a doped optical fiber, which receives an optical pump signal for producing gain. In the architecture for the optical splitter 40 shown in FIG. 3, the input optical signal is amplified by a gain element 42 by an amount necessary to offset the loss in the following 1×N splitter 44. An optical pump 46 forwards an optical pump signal through the gain element by techniques known to those skilled in the art. A similar structure is shown in U.S. Pat. No. 5,323,474, where erbium doped fiber is pumped in an amplifier circuit positioned before the optical splitter. The drawback of this optical circuit architecture is such that if the input signal is high, which would be the case of a lossless splitter placed at the output of a transmitter 48, the signal levels will exceed the capabilities of the gain element 42 and the optical signal will be distorted.

In another lossless optical splitter architecture 50 shown in FIG. 4, the input optical signal is first split in 1×N splitter 51 and then amplified by a factor "N" in a gain element 52 by the amount necessary to offset the loss in the following optical splitter. As before, the optical pump 54 provides the pump signal for exciting any dopants and providing gain. This approach avoids the high signal levels encountered by the architecture of FIG. 3. The resulting low signal level, however, and the loss due to this power splitter results in a poor lossless optical splitter noise figure, which degrades the quality and usefulness of the optical signal. Furthermore, the architecture requires N number of amplifiers resulting in high cost, power usage, and physical size.

Figure 1:
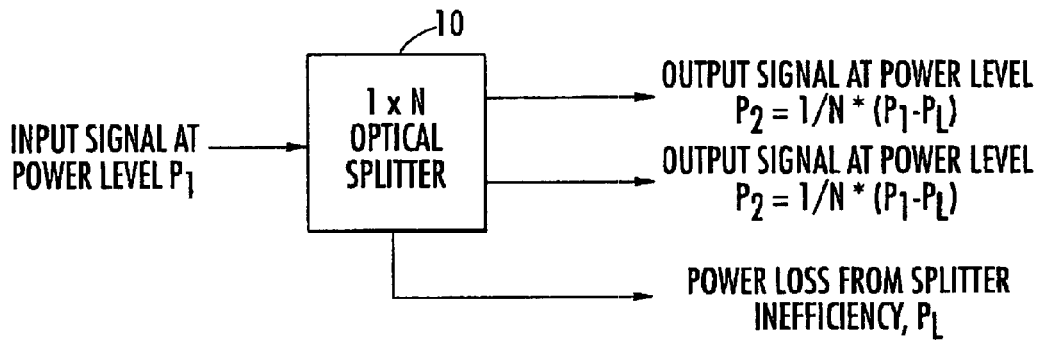
FIG. 1 shows a prior art optical splitter that splits an input optical signal into a plurality of output optical signals, but having an additional power loss because of power inefficiency of the splitter.
Figure 2:
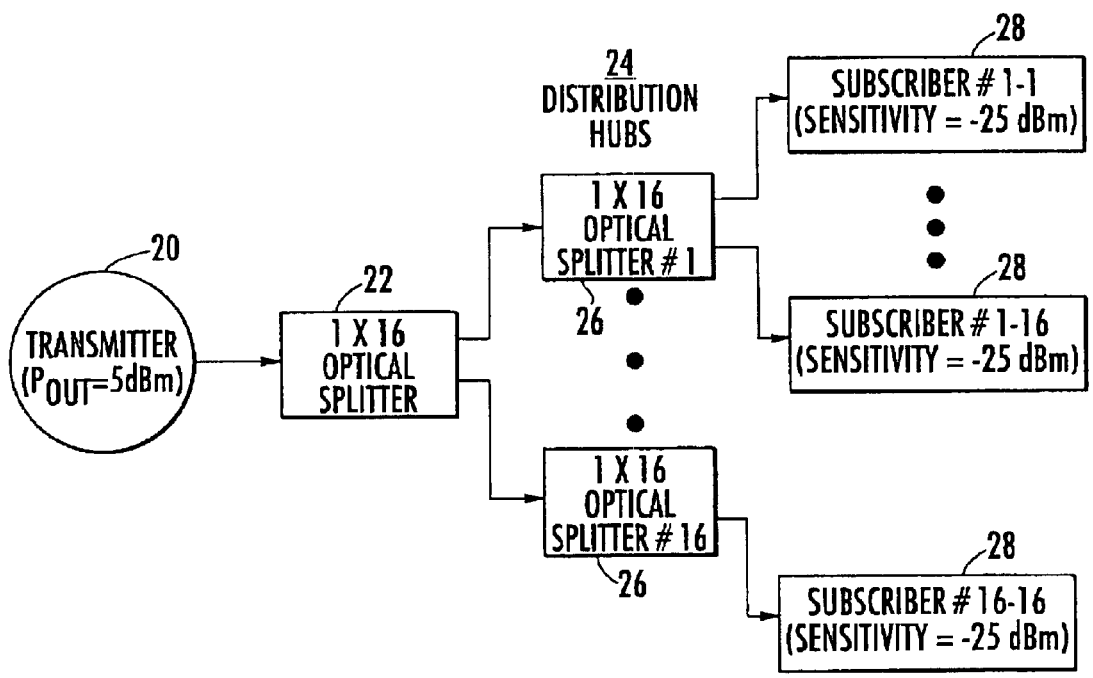
FIG. 2 is another prior art optical splitter system for a cable television network having an optical splitter loss and reduced transmitter availability to subscribers.
Figure 3:
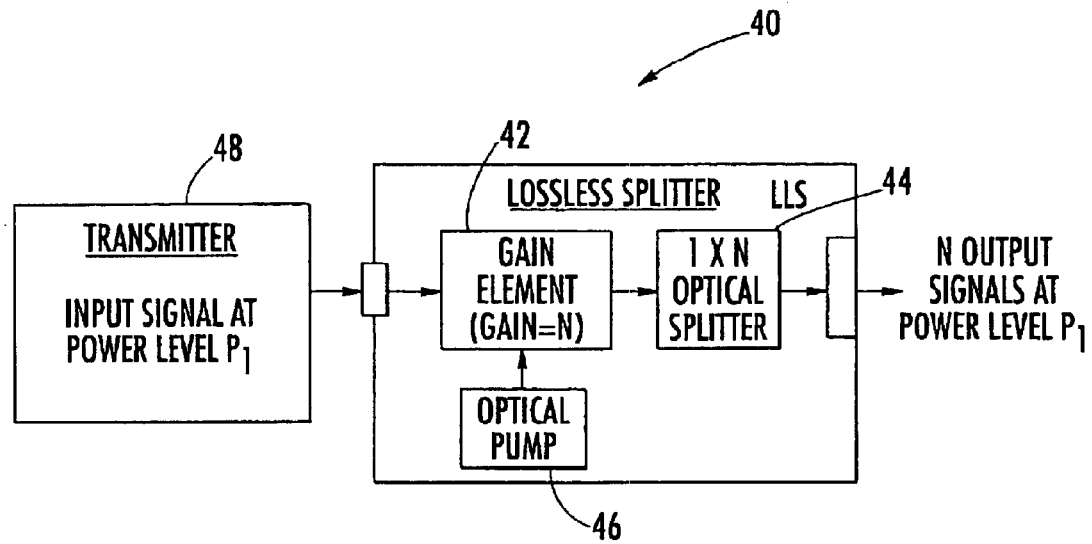
FIG. 3 is a lossless optical splitter that implements an optical gain element into the optical splitter.

In accordance with the present invention, a stepped lossless splitter 70 overcomes the drawbacks illustrated in FIGS. 3 and 4, and is shown in FIGS. 5 and 6. The input signal from the transmitter 72 is processed by an erbium waveguide amplifier that provides simultaneous stepwise signal gain and power splitting functions. A preferred dopant is erbium, which is doped in optical fiber or waveguides and operative at 1550 nanometers (nm) and pumped typically at about 980 or about 1480 nm. Electrical power 74 operates pump driver 76 to drive optical pump 78, which generates an optical pump signal for exciting the erbium atoms along the stepped optical circuit 80 shown in FIG. 6. This process is illustrated in FIG. 6 by the example optical signal path from point A to point B. In this path, the optical signal undergoes 3 dB of gain applied to the optical signal by the pumped erbium waveguide. The optical signal also is split into two optical signals in this path by the geometry of the loss waveguides that results in 3 dB of attenuation of the signal. The net loss of the optical signal as it passes from the optical signal at point A to the split replica of that optical signal at point B is 0 dB. Therefore, the optical signal has been maintained at a near constant level thereby avoiding both the saturation and noise problems previously described and illustrated in FIGS. 3 and 4. Furthermore, by implementing the gain element with a preferred erbium stepped waveguide, the multiple gain element drawback illustrated by the architecture shown in FIG. 4 is also overcome.

In one aspect of the invention, the stepped, optical splitter circuit is formed as $2^m$ optical outputs, where m is the number of steps, e.g., three steps as illustrated in FIG. 6, showing eight optical signal outputs as optical fiber lines. Because of the stepped circuit configuration, the optical pump signal is generated through the stepped optical splitter configuration in the same direction as the optical signal. Typically, as known to those skilled in the art, the optical signal is about 1550 nm wavelength, and could be generated by a distributed feedback laser or other source known to those skilled in the art. The optical pump signal is typically about 980 or about 1480 nm, as known to those skilled in the art.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that the modifications and embodiments are intended to be included within the scope of the dependent claims.

That which is claimed is:

1. A system for processing an optical signal into a plurality of optical output signals comprising:
   a laser for generating an optical signal along an optical signal path;
   an optical splitter positioned along the optical signal path for receiving the optical signal, said optical splitter comprising
   an input optical fiber that receives the optical signal;
   a stepped, optical splitter circuit formed from a plurality of laser ion doped optical waveguides or fibers branching stepwise into a plurality of output optical fibers; and
   an optical pump source for pumping an optical pump signal through the stepped, optical splitter circuit in the same direction as the optical signal entering the input optical fiber, exciting the laser ions in the stepped optical splitter circuit, and distributing gain throughout the optical splitter circuit.

2. The system according to claim 1, wherein said stepped, optical splitter circuit comprises $2n$ optical fiber outputs, wherein n is the number of steps.

3. The system according to claim 1, wherein the optical signal received within the input optical fiber is about 1550 nm wavelength and the optical pump signal is one of about 980 or about 1480 nm.

4. The system according to claim 1, wherein the laser ions comprise erbium ions.

5. An optical splitter comprising:
   an input optical fiber that receives an optical signal;
   a stepped, optical splitter circuit connected to the input optical fiber and formed from a plurality of laser ion doped optical waveguides or fibers branching stepwise into Nm output optical fibers where m is the number of steps in the optical splitter circuit and N is the number of splitter branches; and
   an optical pump source for pumping an optical pump signal through the optical splitter circuit in the same direction as the optical signal entering the input optical fiber, exciting the laser ions in the stepped optical splitter circuit, and distributing gain throughout the optical splitter circuit.

6. An optical splitter according to claim 5, wherein the optical fiber received within the input optical fiber is about 1550 nm wavelength and the optical pump signal is one of about 980 or about 1480 nm.

7. An optical splitter comprising:
   an input optical fiber that receives an optical signal;
   a stepped, optical splitter circuit connected to the input optical fiber and formed from a plurality of laser ion doped optical waveguides or fibers branching stepwise into a plurality of output optical fibers; and an optical pump source for pumping an optical pump signal through the stepped, optical splitter circuit in the same direction as the optical signal entering the input optical filter, exciting the laser ions in the stepped optical splitter circuit and distributing gain throughout the optical splitter circuit.

8. An optical splitter according to claim 7, wherein the optical fiber received within the input optical fiber is about 1550 nm wavelength and the optical pump signal is one of about 980 or about 1480 nm.

9. An optical splitter according to claim 7, wherein the laser ions comprise erbium ions.

10. A method of processing an optical signal into a plurality of optical output signals comprising the steps of:

generating an optical signal;

transmitting the optical signal along an optical fiber to a stepped optical splitter circuit formed from a plurality of laser ion doped optical waveguides or fibers branching into a plurality of output optical fibers; and optically splitting the optical signal stepwise at the splitter into $2m$ output optical signals where m is the number of steps in the optical splitter while simultaneously distributing gain during stepwise splitting by pumping an optical signal within the stepped optical splitter in the same direction as the optical signal passes stepwise through the splitter.

11. A method according to claim 10, and further comprising the step of distributing gain by passing the optical signal through stepped erbium doped waveguides that receive an optical pump signal.

12. A method according to claim 11, and further comprising the step of pumping an optical pump signal through the stepped erbium doped waveguides at a wavelength for exciting erbium and amplifying the optical signal.

13. A method according to claim 12, and further comprising the step of generating the optical signal at about 1550 nm wavelength and pumping the optical pump signal at about one of 980 or about 1480 nm.

14. A method of processing an optical signal into a plurality of optical output signals comprising the steps of:

generating an optical signal;

transmitting the optical signal along an optical fiber signal to a stepped optical splitter circuit formed from a plurality of laser ion doped optical waveguides branching into a plurality of output optical fibers; and optically splitting the optical signal stepwise at the optical splitter circuit into a plurality of output signals while simultaneously distributing gain during the stepwise splitting by pumping an optical pump signal within the stepped optical splitter circuit in the same direction as the optical signal passes stepwise through the optical splitter circuit.

15. A method according to claim 14, and further comprising the step of distributing gain by passing the optical signal through stepped erbium doped waveguides that receive the optical pump signal.

16. A method according to claim 15, and further comprising the step of pumping an optical pump signal through the stepped erbium doped waveguides at a wavelength for exciting erbium and amplifying the optical signal.

17. A method according to claim 16, and further comprising the step of generating the optical signal at about 1550 nm wavelength and pumping the optical pump signal at about one of 980 or about 1480 nm.

18. A method according to claim 14, wherein the laser ions comprise erbium ions.

* * * * *